UNITED STATES PATENT OFFICE.

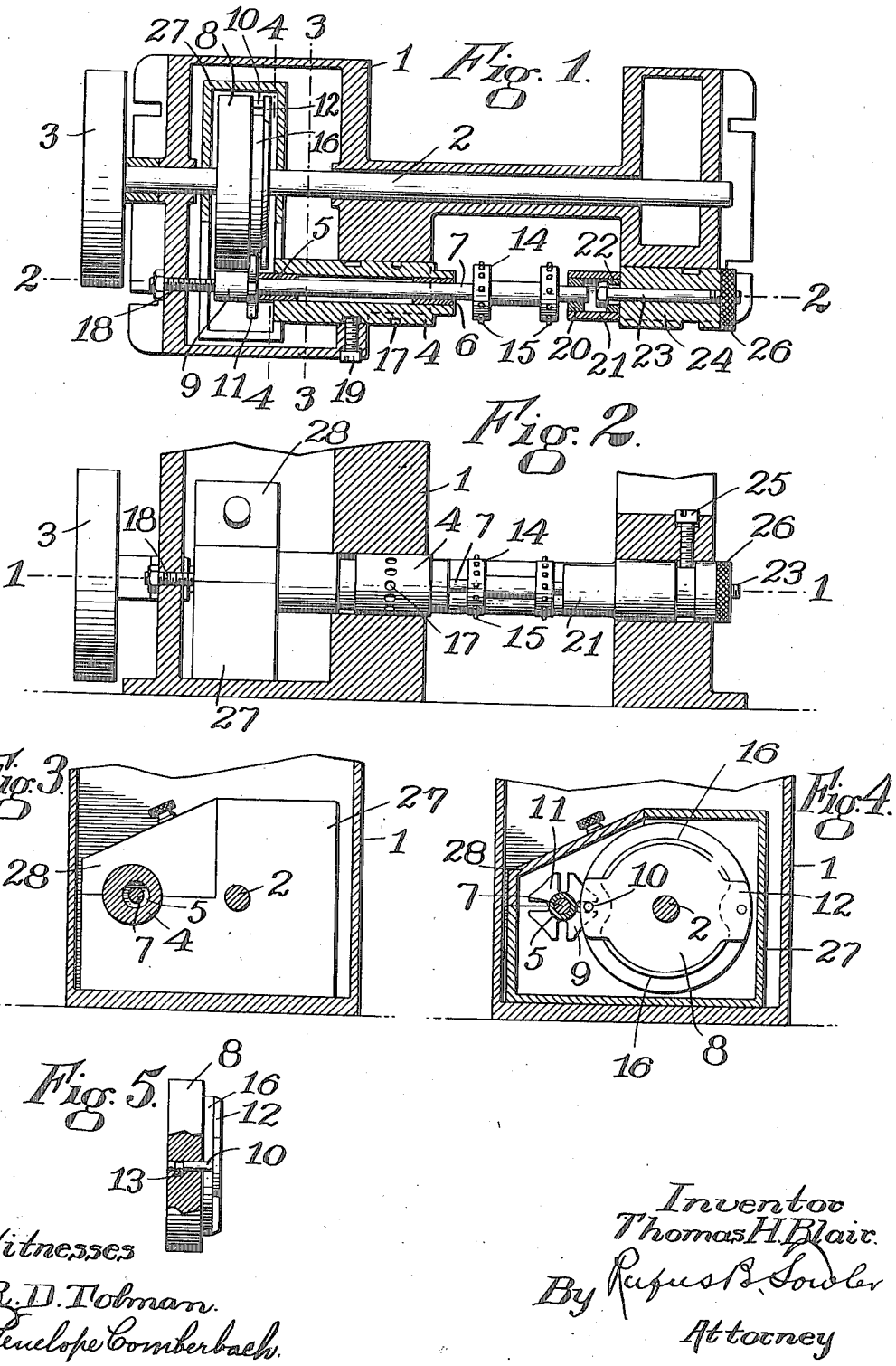

THOMAS H. BLAIR, OF NORTHBORO, MASSACHUSETTS.

ADJUSTABLE BEARING FOR POWER-TRANSMISSION MECHANISM.

1,153,285. Specification of Letters Patent. Patented Sept. 14, 1915.

Application filed September 11, 1913. Serial No. 789,270.

*To all whom it may concern:*

Be it known that I, THOMAS H. BLAIR, a citizen of the United States, residing at Northboro, in the county of Worcester and Commonwealth of Massachusetts, have invented a new and useful Improvement in Adjustable Bearings for Power-Transmission Mechanism, of which the following, together with the accompanying drawing, is a specification.

My invention relates to power transmission mechanism and has particular reference to such mechanism in those instances where adjustment of the distance between a shaft and other coöperating mechanism is desirable.

An object of the invention is to provide a driving and a driven shaft with means whereby the distance between them may be easily, quickly and accurately adjusted, in order to insure proper action of the mechanism connecting the two shafts.

Another object of the invention is to provide an improved means for pivotally supporting the end of a shaft which is adjustable transversely of its axis.

Other objects and advantages will appear from the following description taken in connection with the accompanying drawing.

The principle of my invention will be explained by describing one embodiment thereof in connection with a moving picture machine as shown in the drawing. It is obvious, however, that the principle of the invention may be applied in other forms of machines and apparatus.

In the drawing, Figure 1 is a horizontal sectional view on the line 1—1 of Fig. 2, showing a portion of a moving picture machine, mechanism for feeding strips of film being shown as constructed in accordance with my invention. Fig. 2 is a vertical sectional view on the line 2—2, of Fig. 1. Fig. 3 is a vertical sectional view on the line 3—3, of Fig. 1. Fig. 4 is a vertical sectional view on the line 4—4, of Fig. 1. Fig. 5 is an edge view of the driving element in the Geneva stop motion shown in Figs. 1 and 4, a portion being broken away to show details.

Like reference characters indicate similar parts in the different figures.

The framework 1 of the machine supports a driving shaft 2 in suitable bearings, this shaft carrying a rigidly attached driving pulley 3 on which a belt may run. Any desired means for rotating the shaft 2 might of course be substituted for the pulley 3.

Parallel to the shaft 2 and supported also by the framework is a cylindrical sleeve 4 carrying bearings 5 and 6 in which turns a driven shaft 7. The two shafts 2 and 7 are operatively connected by a Geneva stop motion comprising the driving element 8 attached to the shaft 2 and the driven element 9 attached to the shaft 7. The driving pins 10 are carried loosely in holes in the body portion of the driving element 8 so that they may turn therein to reduce friction when they engage the star wheel 11 of the driven element. The outer ends of the pins 10 are pivotally supported in suitable holes in a plate 12 and longitudinal movement of the pins in their bearings is prevented by screws 13 which loosely engage grooves in the pins as shown in Fig. 5. As is usual in this class of machines, the driven shaft 7 is provided with a pair of film feeding wheels 14 having small projections or teeth 15 on their peripheries to insure positive engagement with the perforated edges of the film.

In order to secure satisfactory results in the operation of a moving picture machine, it is of course essential that the position of each image on the film as the light passes through it be as nearly as possible identical with what was the corresponding position of the next preceding image. It is important for this reason that, as nearly as possible, the successive angular advances of the driven shaft during the intermittent motion imparted to it by the Geneva stop motion be equal, and that there be no chance whatever for any motion of the driven shaft throughout the periods between these angular advances. These results are accomplished by means for delicately but effectively adjusting the distance between the driving and driven shafts so that the concave edges of the teeth of the star wheel 11 will be held accurately against the holding surfaces 16 of the driving element 8 when engaged thereby.

The bearings 5 and 6 support the driven shaft 7 eccentrically with respect to the sleeve 4 and this sleeve is provided with spanner holes 17. The sleeves 4 may therefore be turned on its axis to carry the driven shaft 7 and the star wheel 11 either toward or away from the driving shaft 2 for the purpose already indicated. The screw 18 acts as an adjustable stop for the end of the shaft 7 and longitudinal movement of this shaft in the opposite direction is prevented by adjusting the position of the sleeve 4 so that the bearing 5 will rest against the adjacent face of the star wheel 11. A set screw 19 maintains the parts just referred to in adjusted position.

The end of the shaft 7 opposite the driven element 9 of the Geneva stop motion is supported in a bearing 20 fixed in one end of a hollow cylinder 21 in the other end of which is fixed a hollow ring 22 which provides an interior shoulder to be engaged by the head of a bolt 23. The bolt 23 is carried axially in a sleeve or support 24 mounted in the frame, this sleeve 24 being in alinement with the sleeve 4 and being provided so that the shaft 7, sleeve 4 and parts carried thereby may be placed in and removed from the frame of the machine. The star wheel 11 and the film feeding wheels 14 with their teeth 15 are at least as small as the sleeves 4 and 24, so that they may be withdrawn with said sleeves and with the shaft 7 from the frame of the machine. And the edge of the plate 12 is cut away except at those points which support the pins 10 so that it will not prevent removal of the star wheel 11 with the shaft 7 as the shaft is moved longitudinally out of the frame of the machine. The sleeve 24 is held in position by a set screw 25. The opening in the ring 22 is of course smaller than the head of the bolt 23 but it is considerably larger than the shank of the bolt so that when the bolt is loose the bearing 20 may move with the shaft 7 while its position is being adjusted. Then after the position of the shaft 7 has been adjusted, the bolt 23 is tightened by turning the nut 26 to hold the bearing 20 firmly in place as a support for the shaft.

It is desirable in the operation of moving picture and other machines that they run as quietly as possible. With this end in view, the Geneva stop motion is inclosed in a box 27 having a cover 28, the box and its cover being made of lead or other non resilient material. It has been found that the use of non resilient material for the box and cover is most effective for this purpose. The box and its cover also constitute an inclosure to hold oil for the Geneva stop motion to run in.

While I have shown and described one embodiment of my invention, I do not wish to be limited to the details thereof as certain changes may be made without departing from the spirit of the invention, but

What I claim as new and desire to secure by Letters Patent is:—

1. In a power transmission mechanism a shaft, a sleeve supporting one end of the shaft, a bearing for the other end of the shaft, and a detachable support for said bearing mounted in the machine frame in line with the shaft and its sleeve, said support being as large as the sleeve, whereby the shaft and its sleeve may be removed longitudinally.

2. In a power transmission mechanism a shaft, a bearing for one end of the shaft, a ring rigidly connected to said bearing with its axis in line with the shaft, a bolt extending through said ring, and a support receiving said bolt, whereby said bolt secures the bearing to the support.

3. In a power transmission mechanism a shaft, a bearing for one end of said shaft, a ring in line with said shaft and fixed to the bearing, a bolt passing through said ring with its shank smaller than the opening in the ring, and a support receiving the bolt, whereby the bolt secures the bearing adjustably to the support.

4. In a power transmission mechanism a shaft, means for adjusting the position of the shaft transversely of its axis, a bearing for one end of said shaft, a ring in line with said shaft and fixed to the bearing, a bolt passing through said ring with its shank smaller than the opening in the ring, and a support receiving the bolt, whereby the bolt secures the bearing adjustably to the support.

5. In a power transmission mechanism a shaft adjustable in a circular path, a bearing carried by one end of said shaft, means for supporting said bearing to permit its movement with the shaft as the latter is adjusted, and means for securing said bearing to hold the shaft in adjusted position.

6. In a power transmission mechanism a shaft, means for adjusting one end of said shaft in any direction transversely of the axis of said shaft, a bearing for the other end of said shaft movable therewith to correspond to its various positions of adjustment, and means for securing said bearing in adjusted position.

7. In a power transmission mechanism a shaft adjustable transversely of its axis, a bearing for the shaft movable in any direction in a plane transverse to the axis of the shaft so as to be carried with the shaft while the position of the shaft is being adjusted, and means for securing the bearing in adjusted position.

8. In a machine, a shaft, a member carried by the shaft, a bearing for one end of the shaft, a support, and means for adjustably securing the bearing to the support, the support being in line with the shaft and as large as the bearing and the member carried by the shaft, whereby the said parts may be removed from the machine longitudinally of the shaft.

9. The combination with a supporting frame, of a shaft journaled therein, means for adjusting one end of said shaft transversely of the axis thereof, and a bearing for the other end of the shaft movable therewith as said shaft is adjusted, said bearing being independent of said adjusting means.

10. The combination with a shaft, of a supporting bearing therefor, means for adjusting said bearing to change the position of the shaft, a second bearing for said shaft movable therewith as the same is adjusted, and means for securing said second bearing in adjusted position.

Dated this third day of September, 1913.

THOMAS H. BLAIR.

Witnesses:
 RUFUS B. FOWLER,
 PENELOPE COMBERBACH.